Patented Apr. 7, 1931

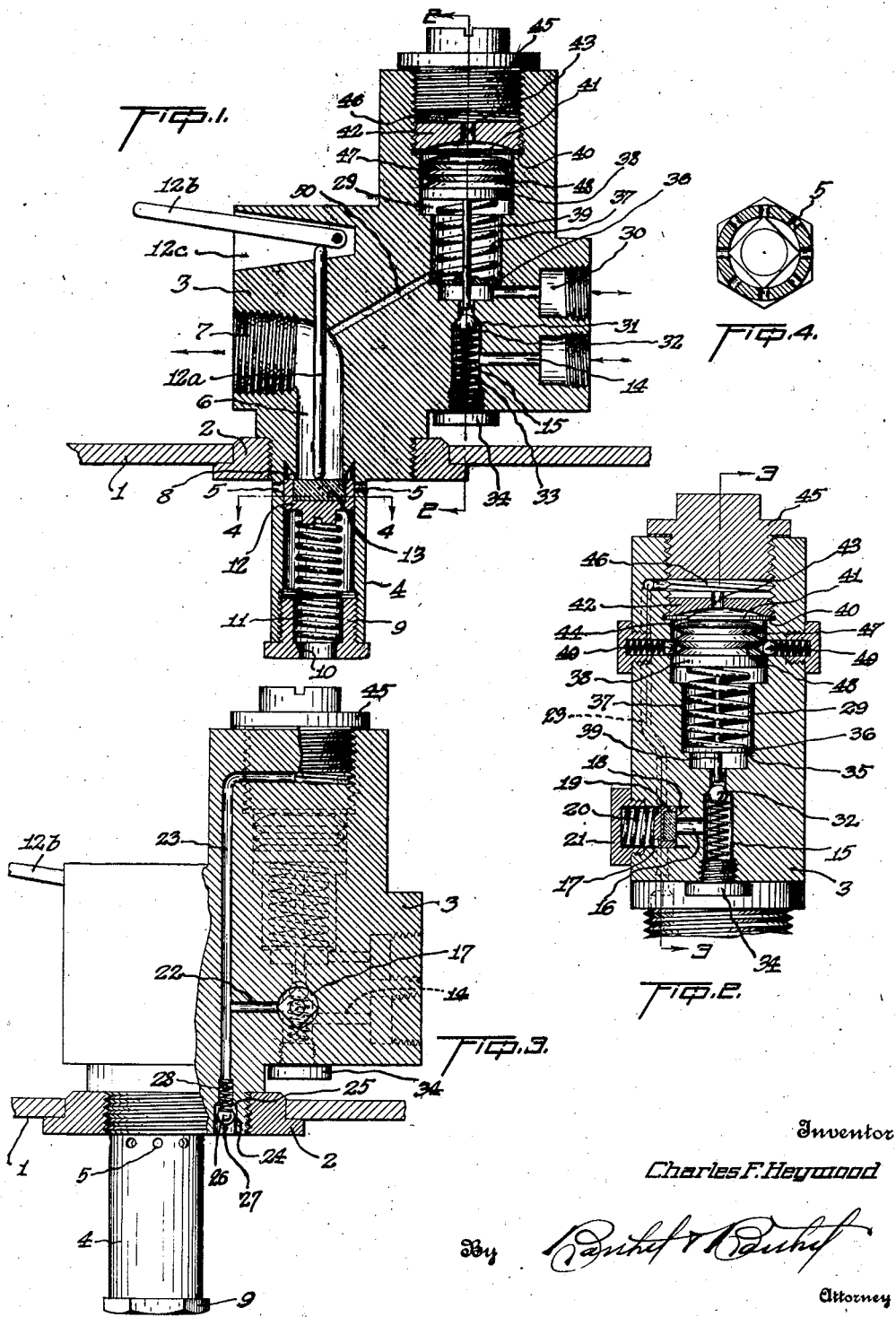

1,799,587

UNITED STATES PATENT OFFICE

CHARLES F. HEYWOOD, OF DETROIT, MICHIGAN, ASSIGNOR TO SKY SPECIALTIES CORPORATION, OF DETROIT, MICHIGAN, A CORPORATION OF MICHIGAN

SUPPLY AND RELIEF VALVE

Application filed November 30, 1927. Serial No. 236,649.

A pressure storage tank which is continuously charged by a pump may be provided with a relief valve which is operated by excessive pressure in the tank to cause the pump to discharge through a bypass into the atmosphere. Although these devices function properly when the maximum desired pressure in the tank is exceeded, they do not respond promptly to close the bypass when the pressure has dropped below the desired maximum. In other words, they usually require that the tank pressure fall considerably below the desired maximum before they are actually reversed and closed.

The object of the present invention is to overcome this difficulty and to provide auxiliary means for closing the bypass. It will be obvious that the valve operating means is acted upon at one side by a conduit leading from the pressure vessel. At the other side of the valve mechanism is provided a spring which must be overcome by the pressure in the vessel in order that the valve shall open. The auxiliary means mentioned above is applied to this side of the valve mechanism. It consists merely of a fluid connection extending to this side of the valve mechanism from the normal or service outlet of the tank. When the latter outlet is opened for operating purposes, the fluid passing through the connection to one side of the valve mechanism will balance the tank pressure at the opposite side of this mechanism, whereupon the spring which normally holds the valve mechanism in open position will accomplish its function without pressure resistance.

The conduit leading from the tank to the valve mechanism for opening the bypass at excessive tank pressure is provided with a pressure balanced check valve which is normally open. This valve is arranged to close in the direction of the valve mechanism. Thus, when the relief valve mechanism is opened at any point for repair or replacement of parts, the relief of pressure thus produced in the valve device will upset the balance of the check valve and cause the latter to close under the influence of the tank pressure. In this manner I avoid the loss of pressure while the valve mechanism is being cleaned or repaired, and this constitutes another feature of the invention.

The invention is fully disclosed by way of example in the following description and in the accompanying drawing, in which—

Figure 1 is a longitudinal section of the device;

Fig. 2 is a section on the line 2—2 of Figure 1;

Fig. 3 is a section on the line 3—3 of Figure 2; and

Figure 4 is a section on the line 4—4 of Figure 1.

Reference to these views will now be made by use of like characters which are employed to designate corresponding parts throughout.

The numeral 1 designates the wall of a storage tank fitted with an adapter 2 into which is threaded a valve block 3. From the base of this block a tube 4 extends into the tank and is formed at its upper end, near the adapter, with a peripheral series of outlet ports 5. A normal or service outlet passage 6 leads from the tube 4 through the block and is formed with a threaded end 7 at a wall of the block for the attachment of a supply line thereto. This line is connected to the point or points at which the pressure fluid is desired, for example, a distributor adapted for successive communication with the cylinders of an engine for turning the engine over as disclosed in my copending application, Serial No. 211,365, filed August 8, 1927.

Immediately over the ports 5 the block is formed with a valve seat 8 which may be described as being positioned between the tube 4 and the outlet 6. Into the lower end of the tube is screwed a ring 9 having an internal flange 10 on which is seated a spring 11. The spring in turn supports a valve head 12 having a composition insert 13 adapted to engage and close the seat 8. The valve head is square or otherwise polygonal, as shown in Figure 4 and has its vertices in engagement with the inner wall of the tube so that the fluid will flow between the sides and the inner wall of the tube to the valve seat. The valve head 12 is actuated by a rod 12a slidably mounted in the block 3, axially of the outlet 6, and having its upper end engaged by an operating lever 12b which is pivoted and movable in a slot 12c formed in the block.

The pressure fluid is supplied to the tank from a pump or other source (not shown) adapted for connection to a passage 14 formed in the block. The passage enters a valve chamber 15, the purpose of which will presently be described, and is extended from this chamber in the form of a duct 16 at right angles to the passage 14 and leading into a valve chamber 17 drilled from a wall of the block as shown more clearly in Figure 2. Between the duct 16 and chamber 17 is formed a valve seat 18 provided with a valve head 19. The head is backed by a spring 20 disposed in the chamber and abutting a plug 21 screwed into the open end of the chamber for closing the same. The path from the passage 14 to the tank is completed by another duct 22 leading from the valve chamber 17 into a conduit 23, having one end entering the tank. This end is enlarged as at 24 to provide a valve seat 25. In the enlargement is disposed a ball valve 26 resting on a pin 27 and normally held spaced from its seat by means of a spring 28 acting thereon in the direction of the tank. It will now be apparent that the valve in the chamber 17 is a check valve which prevents the tank from discharging through the passage 14 when the tank pressure exceeds the charging pressure.

The block is further formed with a chamber 29 containing valve mechanism for controlling a relief bypass. This bypass consists of the passage 14, the valve chamber 15 leading into the base of the chamber 29, and a relief passage 30 extending from the base of the chamber 29. Between the valve chamber 15 and the chamber 29 is formed a valve seat 31 engageable by a ball valve 32. This valve is normally held against its seat by a spring 33 resting on a plug 34 closing the chamber 15 at the wall of the block 3. The bypass is normally obstructed by the ball valve 32 but is opened for the purpose of permitting the pump to discharge into the atmosphere by the operation of mechanism within the chamber 29 when the tank pressure exceeds the determined maximum.

In the lower part of the chamber 29 is formed an internal shoulder 35 directly above the connection between the chamber and the passage 30, and on this shoulder is supported a sealing disk 36. On the disk is supported a spring 37 capable of being overcome by excessive pressure in the tank. On the spring is mounted a plunger 38 slidably mounted in the chamber and provided with a stem 39 passing axially through the spring and through the disk 36 to a point close to the ball valve 32. In the upper part of the chamber is formed another shoulder 40 on which is laid a diaphragm 41 engaging the top of the plunger 38. The diaphragm is bound at its edge by a nut 42 screwed down towards the shoulder 40. The nut has a central aperture 43 to permit flow of pressure fluid to the diaphragm and is also formed with a concave lower surface 44 providing a pressure chamber immediately above the diaphragm. A plug 45 is screwed into the outer end of the chamber 29 and is spaced as at 46 from the top of the nut 42. The above mentioned conduit 23 leading to the tank is also in communication with the space 46 as shown in Figure 3.

In the operation of the device as thus far described, the tank pressure is at all times acting on the top of the diaphragm through the conduit 23, space 46 and port 43. The spring 37 is adjusted to resist the pressure on the diaphragm, and thus prevent the pin 39 from opening the valve 32, while the pressure in the tank is not excessive. When the desired maximum pressure is exceeded, the spring is overcome, and the plunger and stem move downwardly to unseat the valve 32. The fluid which is charged into the passage 14 is thereby bypassed through the passage 30 without reaching the tank.

In order to maintain the valve 32 definitely in open or closed position, the plunger is provided with a pair of peripheral grooves 47 and 48 cooperating with spring pressed balls 49 mounted in the block 3 and adapted to enter either one groove or the other.

The means for facilitating reclosing of the ball valve 32 when the tank pressure is no longer excessive consists of a connection or duct 50 extending from the normal outlet 6 to the chamber 29. Assuming that the plunger fails to respond to the pressure drop in the tank, the full tank pressure will be applied to the lower face of the plunger when the delivery valve 12 is next opened for service purposes. In this manner the constant pressure on the top of the diaphragm will be balanced by the pressure admitted through the duct 50, and the spring 37 will now be free to return the plunger to valve-closing position.

The sealing disk 36 prevents the pressure delivered through the duct 50 from escaping through the passage 30, whereby the total pressure from this source is actively applied to the bottom of the plunger. The disk also guides the pin 39 and prevents oil from being thrown from the pump against the spring, plunger and diaphragm.

It will be apparent that the relief valve and delivery valve may constitute separate members, rather than being built in a single block as shown, in which case the normal outlet 6 may be joined to the chamber 29 by a pipe or the like. It is also to be observed that the ball valve 26 is normally balanced by pressure on both sides thereof, and as a consequence of this arrangement, the valve will close when the pressure in the space 46 is relieved as by removing the nut 45 for cleaning or repairing the valve mechanism.

Although a specific embodiment of the invention has been illustrated and described, it will be understood that various alterations in the details of construction may be made without departing from the scope of the invention as indicated by the appended claims.

What I claim is:—

1. In a safety valve, a relief bypass, pressure actuated valve mechanism controlling said bypass, a fluid conduit leading to said mechanism and adapted for communication with a pressure vessel, a valve in said conduit adapted to close in the direction of said valve mechanism, and means acting on said valve in the opposite direction to normally hold it open.

2. In combination with a safety valve adapted for connection to a pressure vessel and having a relief bypass and valve mechanism controlling the same; a normal outlet adapted for connection to the pressure vessel, a fluid connection extending from the outlet to said valve mechanism and positioned to return the valve mechanism, by the passage of fluid through the connection, to normal or closed position, and a discharge valve controlling said outlet and fluid connection extending therefrom.

3. In combination with a safety valve adapted for connection to a pressure vessel and having a relief bypass and valve mechanism controlling the same; a normal outlet adapted for connection to the pressure vessel, a fluid connection extending from the outlet to said valve mechanism and positioned to return the valve mechanism, by the passage of fluid through the connection, to normal or closed position, a seal between said bypass and the outlet end of said connection, and a discharge valve controlling said outlet and fluid connection extending therefrom.

4. A safety valve adapted for connection to a pressure vessel and having a relief bypass and a valve controlling and normally closing the same, a plunger adapted to open said valve, and a connection from the vessel to one side of the plunger for moving the latter to the valve-opening position; in combination with a normal outlet adapted for connection to said vessel, and a fluid connection extending from said outlet and presented to the other side of said plunger.

5. A safety valve adapted for connection to a pressure vessel and having a relief bypass, a valve controlling and normally closing the same, a chamber, a seal positioned between said bypass and chamber, a plunger mounted in said chamber, a spring positioned between said seal and plunger, a pin extending from said plunger through said seal and adapted to engage said valve, a diaphragm fixed in the chamber and engaging one side of said plunger, and a connection from the vessel to the diaphragm for moving the plunger to the valve-opening position; in combination with a normal outlet adapted for connection to said vessel, and a fluid connection extending from said outlet to said chamber and positioned to return the plunger, by the passage of fluid through the connection, to normal or valve-closing position.

In testimony whereof I affix my signature.

CHARLES F. HEYWOOD.